United States Patent
Choi et al.

(10) Patent No.: US 10,587,865 B2
(45) Date of Patent: Mar. 10, 2020

(54) 3D RECONSTRUCTION APPARATUS AND METHOD INCLUDING MATERIAL APPEARANCE MODELING

(71) Applicant: GWANGJU INSTITUTE OF SCIENCE AND TECHNOLOGY, Buk-gu, Gwangju (KR)

(72) Inventors: Jun Ho Choi, Gwangju (KR); Kwan Heng Lee, Gwangju (KR); Yong Hwi Kim, Gwangju (KR); Ahmed Bilal, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 15/913,362

(22) Filed: Mar. 6, 2018

(65) Prior Publication Data

US 2018/0262750 A1    Sep. 13, 2018

(30) Foreign Application Priority Data

Mar. 7, 2017    (KR) .......................... 10-2017-0029140

(51) Int. Cl.
*H04N 13/00* (2018.01)
*G06T 7/00* (2017.01)
(Continued)

(52) U.S. Cl.
CPC .......... *H04N 13/296* (2018.05); *G06T 7/586* (2017.01); *G06T 7/74* (2017.01); *G06T 17/00* (2013.01);
(Continued)

(58) Field of Classification Search
CPC .......... H04N 13/243; H04N 2213/001; H04N 13/282; H04N 5/23238; H04N 13/271;
(Continued)

(56) References Cited

U.S. PATENT DOCUMENTS 5,821,943 A * 10/1998 Shashua ................. G06T 15/20
345/427
9,495,764 B1    11/2016 Boardman et al.
(Continued)

FOREIGN PATENT DOCUMENTS

EP    1380971 A1    1/2004
JP    H11504452 A    4/1999
(Continued)

OTHER PUBLICATIONS

Korean Patent Office, Notice of Grant for related Application No. KR 10-2017-0029140, dated May 29, 2018, 8 pages.
(Continued)

*Primary Examiner* — Alison Slater
(74) *Attorney, Agent, or Firm* — Brooks Kushman P.C.

(57) ABSTRACT

An apparatus and method capable of simultaneously acquiring 3D geometry and appearance modeling data. The 3D reconstruction apparatus including material appearance modeling includes a light source arc including light sources configured to irradiate an object located at a photographing stage, a camera arc including cameras configured to photograph the object at the photographing stage, a driving operation unit configured to rotate the light source arc and camera arc, and a control unit configured to control the light source arc, camera arc, and driving operation unit. The control unit rotates the light source arc and camera arc at a constant interval based on an operation axis through the driving operation unit, and multiple image samples are acquired by operating the light source and camera at a predefined location in a hemi-sphere direction with respect to the object, whereby 3D modeling information including information about geometry and texture can be provided.

8 Claims, 8 Drawing Sheets

(51) Int. Cl.

| | | |
|---|---|---|
| *B41J 1/00* | (2006.01) | |
| *G01J 1/02* | (2006.01) | |
| *G06F 15/00* | (2006.01) | |
| *G06T 17/20* | (2006.01) | |
| *H04N 13/296* | (2018.01) | |
| *G06T 7/73* | (2017.01) | |
| *H04N 13/254* | (2018.01) | |
| *H04N 13/282* | (2018.01) | |
| *G06T 17/00* | (2006.01) | |
| *G06T 7/586* | (2017.01) | |
| *H04N 13/271* | (2018.01) | |
| *H04N 13/243* | (2018.01) | |

(52) U.S. Cl.
CPC ........... *G06T 17/20* (2013.01); *H04N 13/243* (2018.05); *H04N 13/254* (2018.05); *H04N 13/271* (2018.05); *H04N 13/282* (2018.05); *G06T 2200/08* (2013.01); *G06T 2207/10012* (2013.01); *G06T 2207/10024* (2013.01); *G06T 2207/10028* (2013.01); *G06T 2207/30244* (2013.01)

(58) Field of Classification Search
CPC ...... H04N 13/10; H04N 13/106; G06T 17/00; G06T 7/55; G06T 1/0007; G06T 15/04; G06T 19/00; G06T 2200/08; G06T 7/33; G06T 7/70
See application file for complete search history.

(56) References Cited

U.S. PATENT DOCUMENTS

| | | |
|---|---|---|
| 2002/0085219 A1* | 7/2002 | Ramamoorthy ........ G06T 15/10 358/1.9 |
| 2005/0264561 A1 | 12/2005 | Knast et al. |
| 2011/0273442 A1 | 11/2011 | Drost et al. |
| 2016/0360184 A1 | 12/2016 | Tausch et al. |
| 2018/0025484 A1* | 1/2018 | Burton ............... H04N 1/00827 382/141 |

FOREIGN PATENT DOCUMENTS

| | | |
|---|---|---|
| JP | 2011002331 A | 1/2011 |
| JP | 2011238204 A | 11/2011 |
| KR | 1020170008638 A | 1/2017 |

OTHER PUBLICATIONS

Choi et al., Appearance and Geometry Acquisition for Realistic Rendering of a Cultural Artifact using SVBRDF, Asian Conference Design and Digital Engineering, 2016, Korea.

Choi et al., Realistic Digital Cultural Library based 3D Shape Acquisition System, Proceedings of the Society for Computational Design and Engineering Conference, 2017, Korea.

Hong et al., An ROI Coding Technique of JPEG2000 Image Including Some Arbitrary ROI, Journal of the Korea Society of Computer and Information, 2010, Korea.

Korean Patent Office, First Office Action issued for corresponding Korean Application No. 10-2017-0029140, 2017, 6 pages.

* cited by examiner

3D RECONSTRUCTION APPARATUS AND METHOD INCLUDING MATERIAL APPEARANCE MODELING

CROSS-REFERENCE TO RELATED APPLICATIONS

This application claims foreign priority benefits under 35 U.S.C. § 119(a)-(d) to Korean Patent Application No. 10-2017-0029140, filed on Mar. 7, 2017, in the Korean Intellectual Property Office, the entire contents of which is incorporated herein in its entirety by reference.

BACKGROUND

The present disclosure relates to a three-dimensional (3D) reconstruction apparatus and method including material appearance modeling, and more particularly, to a measurement apparatus and method capable of simultaneously acquiring 3D geometry and appearance modeling data.

As the digitization of content is accelerated, a lot of researches and patents on apparatuses and methods for generating virtual 3D content are being performed.

A conventional image-based 3D scanner reconstructs only the geometry of an object to be measured, or performs reconstruction while synthesizing a texture acquired through a camera on a preceding geometry.

The conventional image-based 3D scanner has a problem that it is difficult to express reflection characteristics appearing due to light and surface interaction, such as specular, shadow, masking, and inter reflection of an original image by a photographing method of a conventional commercial scanner.

Since general 3D scanners not including material appearance modeling or simple multi-stereo-based methods that reconstruct only geometry or generate a texture through an image acquired in a measurement environment, reflection characteristics of light and surface interaction appearing in a real world cannot be visualized, thus causing a sense of difference.

In the case of most measurement apparatus that measure light and surface interaction, the measurement is performed while rotating a light source module based on one material sample sphere. Generally, material appearance modeling and 3D geometry measurement should be separately performed. Such a method is not only time-consuming but also must match data measured by individual apparatuses, resulting in limited accuracy.

That is, a method of generating a texture based on an image simply acquired in a measurement environment can obtain information on the appearance of an object, but it is difficult to obtain information on the texture of an object.

SUMMARY

Embodiments provide a 3D reconstruction apparatus and method including material appearance modeling, capable of providing 3D modeling information including information about geometry and texture.

In one embodiment, a 3D reconstruction apparatus including material appearance modeling includes: a light source arc including a plurality of light sources configured to irradiate an object located at a photographing stage; a camera arc including a plurality of cameras configured to photograph the object located at the photographing stage; a driving operation unit configured to rotate the light source arc and the camera arc; the photographing stage on which the object is disposed; and a control unit configured to control the light source arc, the camera arc, and the driving operation unit, wherein the control unit rotates the light source arc and the camera arc at a constant interval based on an operation axis through the driving operation unit, and a plurality of image samples are acquired by operating the light source and the camera at a predefined location in a hemi-sphere direction with respect to the object.

In another embodiment, a method for controlling a 3D reconstruction apparatus including material appearance modeling includes: driving a light source arc including a plurality of light sources to irradiate light on an object disposed on a photographing stage; and controlling a camera arc including a plurality of cameras to photograph the object disposed on the photographing stage, irradiating the light on the object disposed on the photographing stage and the photographing of the object disposed on the photographing stage rotate the light source arc and the camera arc at a constant interval based on an operation axis, and a plurality of image samples are acquired by operating the light source and the camera at a predefined location in a hemi-sphere direction with respect to the object.

The details of one or more embodiments are set forth in the accompanying drawings and the description below. Other features will be apparent from the description and drawings, and from the claims.

DETAILED DESCRIPTION OF THE EMBODIMENTS

Figure 1A:
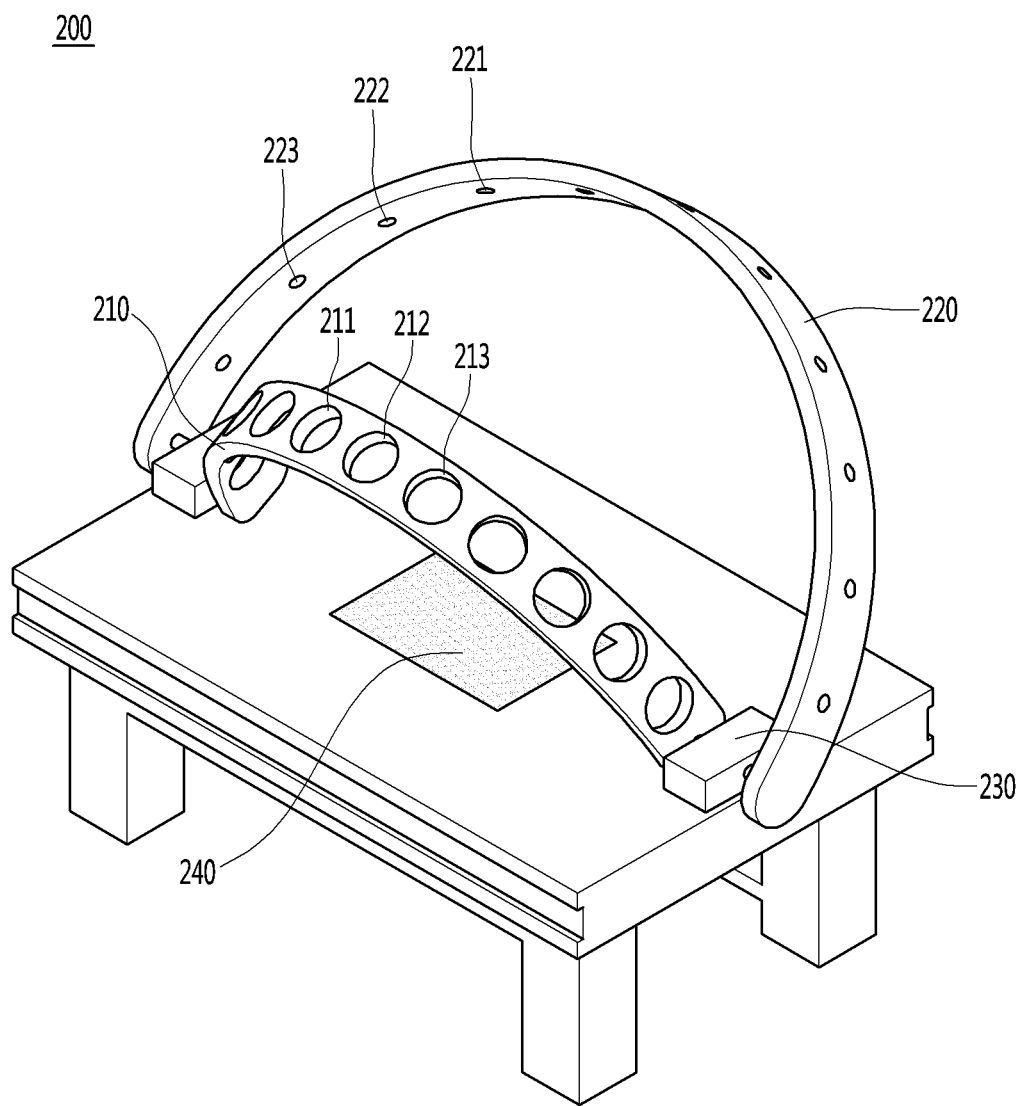
FIGS. 1A and 1B are conceptual diagrams of a 3D reconstruction apparatus including material appearance modeling according to an embodiment of the present disclosure.

Specific embodiments of the present disclosure will be described in detail with reference to the accompanying drawings. The disclosure may, however, be embodied in many different forms and should not be construed as being limited to the embodiments set forth herein; rather, that alternate embodiments included in other retrogressive disclosures or falling within the spirit and scope of the present disclosure can easily be derived through adding, altering, and changing, and will fully convey the concept of the disclosure to those skilled in the art.

While the present disclosure has been described in connection with certain exemplary embodiments, it is to be understood that the disclosure is not limited to the disclosed embodiments, but, on the contrary, is intended to cover various modifications and similarities. It should be understood, however, that the disclosure is not intended to be limited to the specific embodiments, but includes all modifications, equivalents, and alternatives falling within the spirit and scope of the disclosure. Like reference numerals are used for similar elements in describing each drawing.

Hereinafter, preferred embodiments of the present disclosure will be described in detail with reference to the accompanying drawings.

Figure 1B:
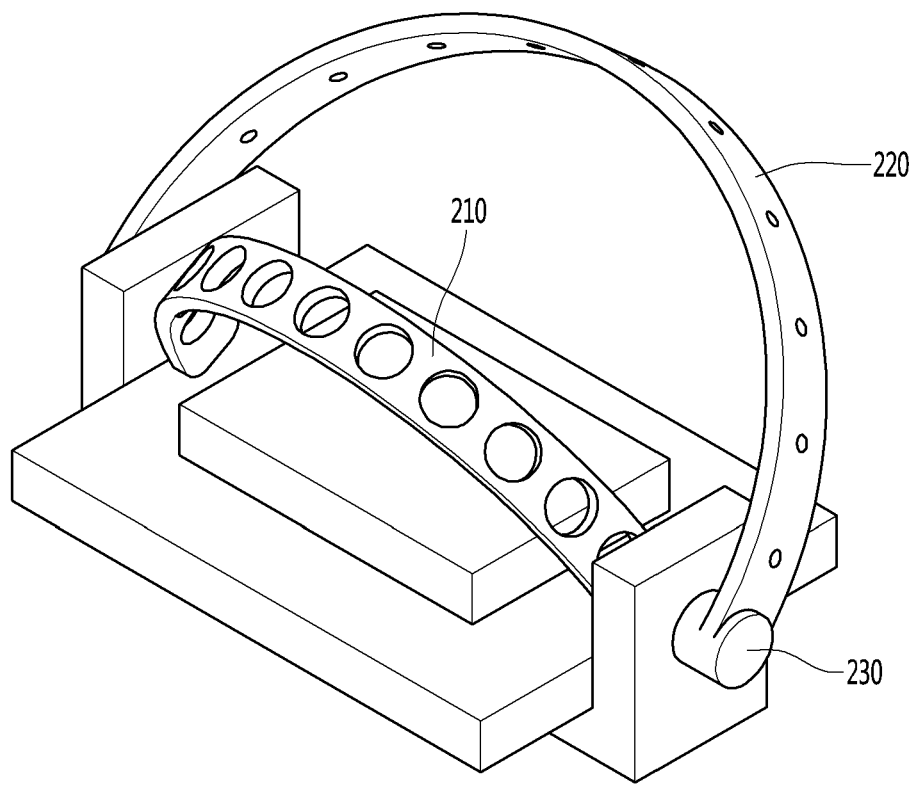

FIGS. 1A and 1B are conceptual diagrams of a 3D reconstruction apparatus including material appearance modeling according to an embodiment of the present disclosure.

Figure 2:
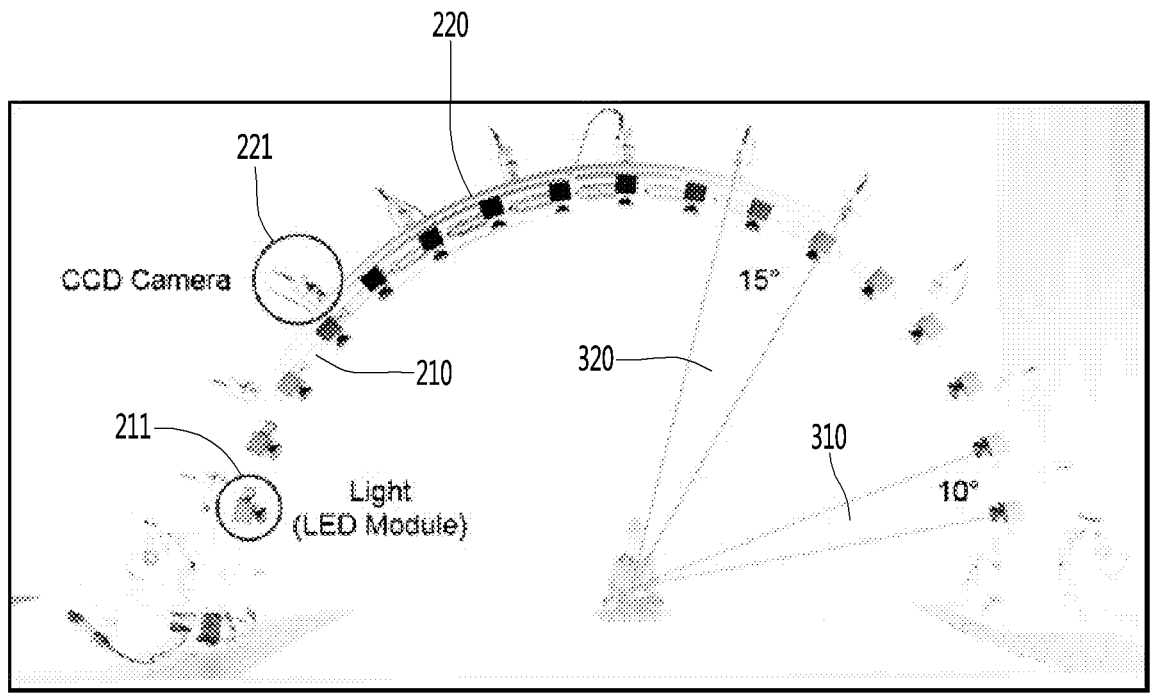
FIG. 2 is a conceptual diagram for describing an arrangement of a light source and a camera in a 3D reconstruction apparatus including material appearance modeling according to an embodiment of the present disclosure.

FIG. 2 is a conceptual diagram for describing an arrangement of a light source and a camera in the 3D reconstruction apparatus including material appearance modeling according to an embodiment of the present disclosure.

Referring to FIGS. 1A, 1B, and 2, the 3D reconstruction apparatus 200 including material appearance modeling may include a light source arc 210, a camera arc 220, a driving operation unit 230, a photographing stage 240, and a control unit (not shown).

The light source arc 210 and the camera arc 220 may be configured in an arc-shaped structure.

Specifically, the light source arc 210 may include a plurality of light sources 211, 212, and 213. A type of the light source is not limited. The light source may irradiate the photographing stage 240 of the 3D reconstruction apparatus 200 including material appearance modeling to provide a light source effect to an object (not shown) located in the photographing stage 240.

In one embodiment of the present disclosure, the light source arc 210 may include a plurality of light sources. Specifically, the light source arc 210 may include 17 light sources. Also, an angle between the light sources may be constant. Specifically, the light sources may be arranged at an angle 310 of 10 degrees.

The camera arc 220 may include a plurality of cameras 221, 222, and 223. A type of the camera is not limited. The camera may photograph an object disposed in the photographing stage 240 of the 3D reconstruction apparatus 200 including material appearance modeling.

In one embodiment of the present disclosure, the camera arc 220 may include a plurality of cameras. Specifically, the camera arc 220 may include 11 cameras. Also, an angle between the cameras may be constant. Specifically, the cameras may be arranged at an angle 320 of 15 degrees.

In FIGS. 1A and 1B, the light source arc 210 is disposed inside, and the camera arc 220 is disposed outside. However, the positions of the light source arc 210 and the camera arc 220 are not fixed. The light source arc 210 may be disposed outside, and the camera arc 220 may be disposed inside.

The driving operation unit 230 may rotate the light source arc 210 and the camera arc 220. The driving operation unit 230 may include a plurality of motors, and the control unit may individually control the light source arc 210 and the camera arc 220.

The control unit may control an overall operation of the 3D reconstruction apparatus including material appearance modeling. Specifically, the control unit may control the light source arc 210, the camera arc 220, and the driving operation unit 230.

The control unit may control the operations of the light sources included in the light source arc 210. Therefore, the operation or non-operation of the light source at a specific position may be determined.

Also, the control unit may control the operations of the cameras included in the camera arc 220. Therefore, the operation or non-operation of the camera at a specific position may be determined.

Also, the control unit may control the driving operation unit 230. Therefore, the control unit may control a driving direction, a driving speed, and the like of the driving operation unit.

In one embodiment of the present disclosure, the 3D reconstruction apparatus 200 including material appearance modeling has to photograph in all directions, like an existing dome shape on a hemi-sphere. Thus, each arc may acquire a plurality of image samples in directions of the entire light sources and cameras on a hemi-spherical shape based on an object to be measured, while rotating at a constant interval based on an operation axis by the driving operation unit 230.

In one embodiment of the present disclosure, the 3D reconstruction apparatus 200 including material appearance modeling has to photograph in all directions, like an existing dome shape on a hemi-sphere. Thus, each arc may acquire a plurality of image samples in directions of the entire light sources and cameras on a hemi-spherical shape based on an object to be measured, while rotating at a constant interval based on a operation axis by the driving operation unit 230.

The 3D reconstruction apparatus 200 including material appearance modeling may acquire a plurality of image samples in various camera directions, including various light source effects, by using the above-described method.

According to one embodiment of the present disclosure, the 3D reconstruction apparatus 200 including material appearance modeling is an effective and cost-effective measurement apparatus that is capable of acquiring data necessary for material modeling considering reflection characteristics simultaneously with 3D geometry reconstruction data.

According to one embodiment of the present disclosure, when a user inputs a command for measurement, the 3D reconstruction apparatus 200 including material appearance modeling turns on the light sources one by one, and the 11 cameras of the camera arc simultaneously photograph. When the photographing is completed, the arc is rotated by the driving unit to cover the entire hemi-spherical directions, thereby automatically acquiring entire data. That is, the 3D reconstruction apparatus 200 including material appearance modeling may be driven in a one-button form. Therefore, the entire data may be automatically photographed without complicated operation.

Specifically, the measurement sample images of the 3D reconstruction apparatus 200 including material appearance modeling may be changed according to the number of cameras, the number of light sources, and the number of times of controls of the driving operation unit. In one embodiment of the present disclosure, 54,043 (11×17×17×17) sheets (the number of cameras×the number of light sources×the number of times of controls of the camera arc×the number of times of controls of the light source arc) of images are acquired. Here, 54043 sheets is only one example, and the number of sample images may be larger than 54043. Also, the measurement sample images of the 3D reconstruction apparatus 200 including material appearance modeling may acquire more accurate data according to the number of times of controls of the arc.

Figure 3:
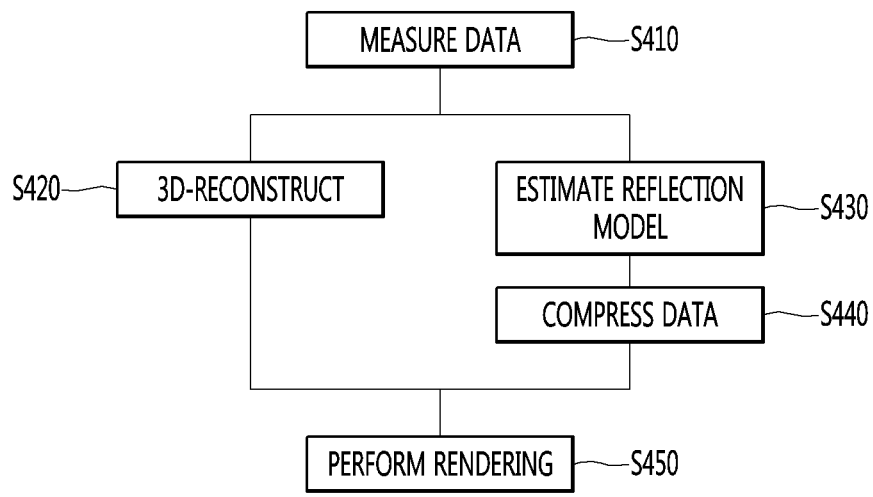
FIG. 3 is a flowchart of a 3D modeling method using a 3D reconstruction apparatus including material appearance modeling according to an embodiment of the present disclosure.

FIG. 3 is a flowchart of a 3D modeling method using the 3D reconstruction apparatus including material appearance modeling according to an embodiment of the present disclosure.

The 3D modeling method according to an embodiment of the present disclosure may include measuring data (S410), 3D-reconstructing a measurement sample (S420), estimating a reflection model (S430), compressing data (S440), and performing rendering (S450).

In the measuring of the data (S410), as described with reference to FIGS. 1A to 2, when a user inputs a command for measurement, the light sources are turned on one by one, and the 11 cameras of the camera arc simultaneously photograph. When the photographing is completed, the arc is rotated by the driving unit to cover the entire hemi-spherical directions, thereby automatically acquiring the entire data.

Figure 4:
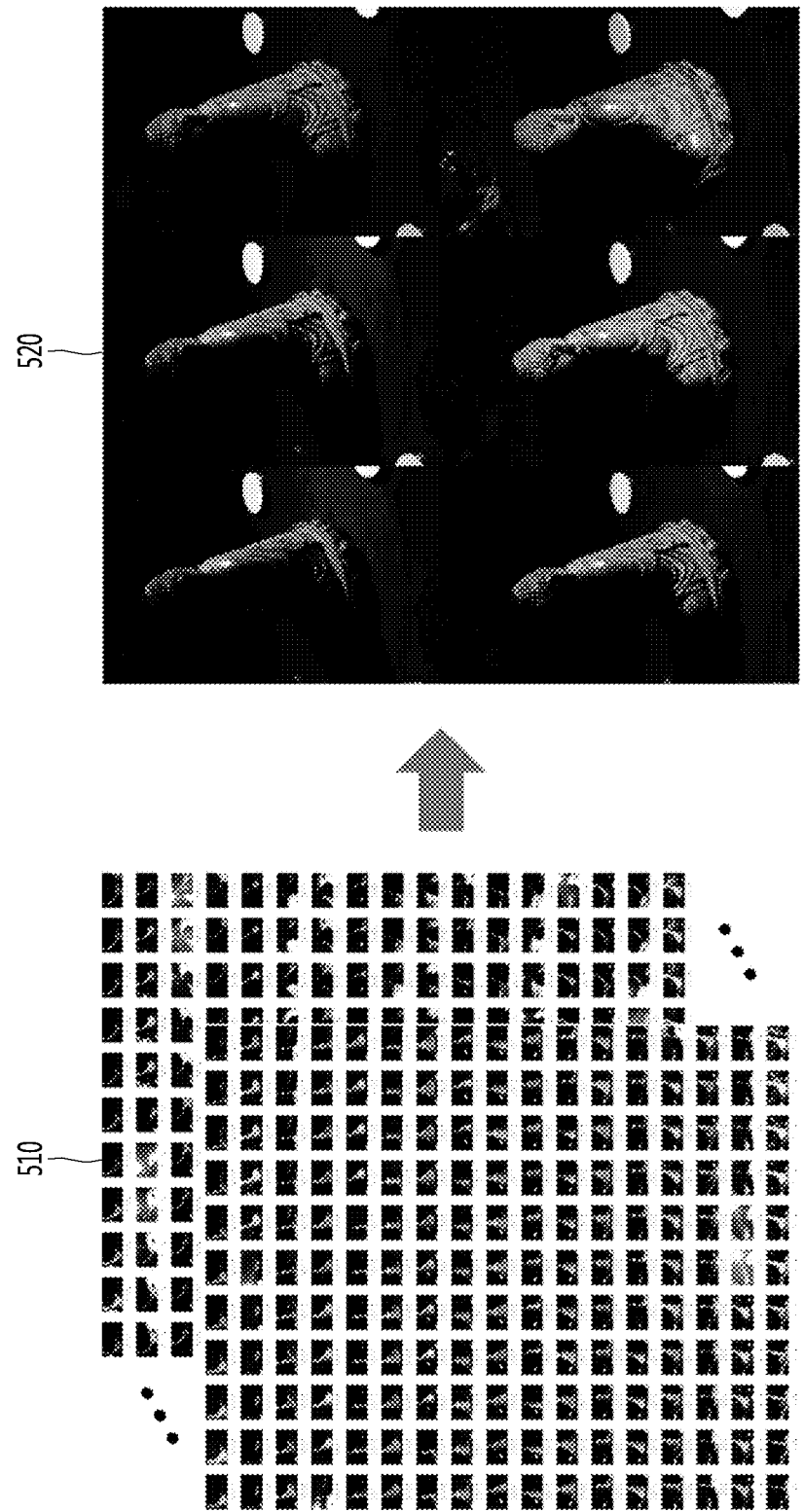
FIG. 4 is a diagram for describing a method of acquiring measurement sample images by using 3D reconstruction apparatus including material appearance modeling according to an embodiment of the present disclosure.

FIG. 4 is a diagram for describing a method of acquiring the measurement sample image by using the 3D reconstruction apparatus including material appearance modeling according to an embodiment of the present disclosure.

Referring to FIG. 4, the 3D reconstruction apparatus 200 including material appearance modeling may sequentially store the acquired image samples by a data processor. Also, each image sample may be labeled according to the positions of the cameras and light sources.

That is, the 3D reconstruction apparatus 200 including material appearance modeling may acquire data composed of multiple cameras and light sources by using the above-described method.

Again, FIG. 3 is described.

In the 3D-reconstruction of the measurement sample (S420), the 3D reconstruction apparatus 200 including material appearance modeling may reconstruct a 3D geometry of an object to be measured. Specifically, the 3D reconstruction apparatus 200 including material appearance modeling may reconstruct the 3D geometry of the object to be measured by applying Structure from Motion (SfM), which is a 3D geometry reconstruction method of a multi-stereo method based on image samples photographed at different camera positions on the previously measured hemi-sphere.

Figure 5A:
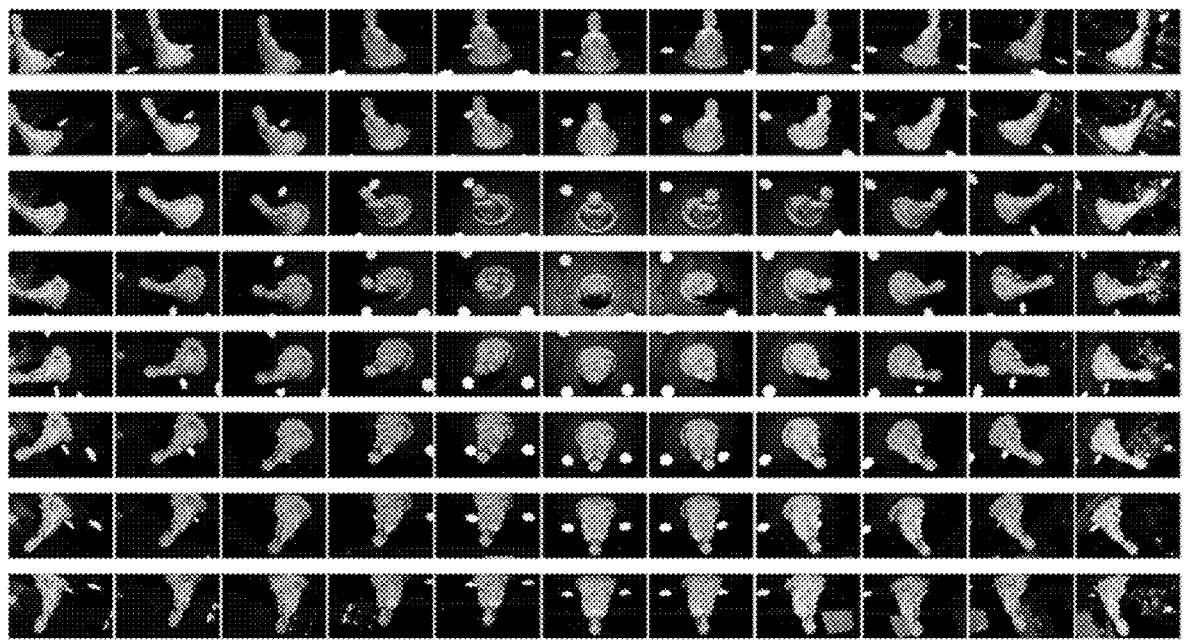
FIGS. 5A and 5B are diagrams for describing a 3D geometry reconstruction method according to an embodiment of the present disclosure.
Figure 5B:
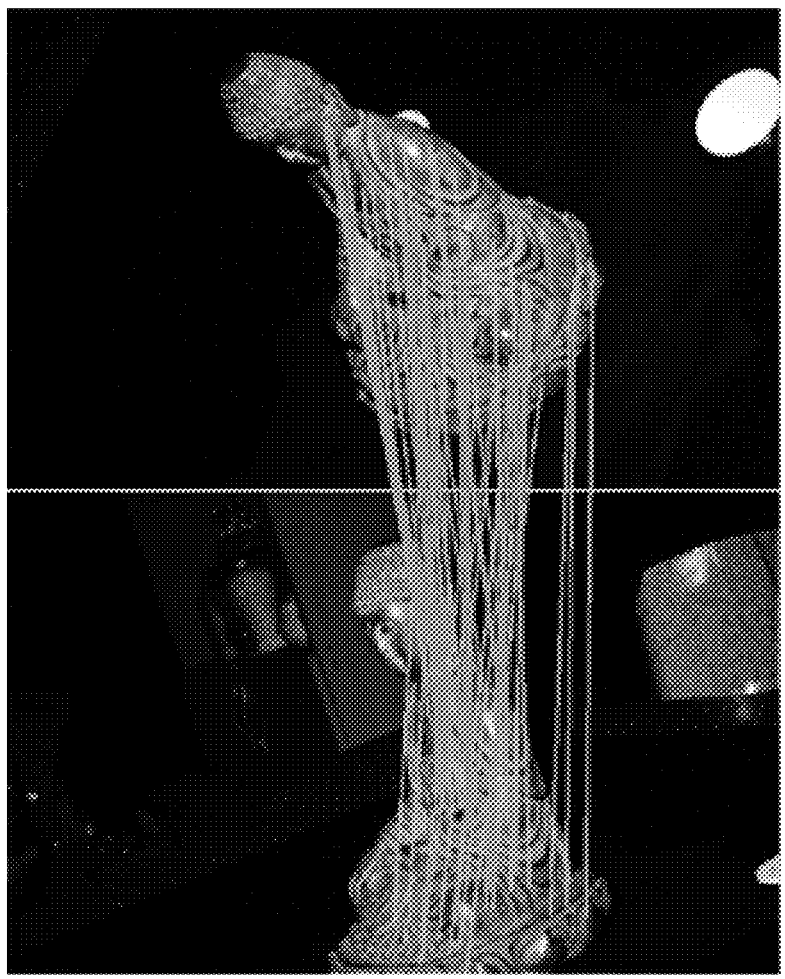

FIGS. 5A and 5B are diagrams for describing a 3D geometry reconstruction method according to an embodiment of the present disclosure.

Figure 6:
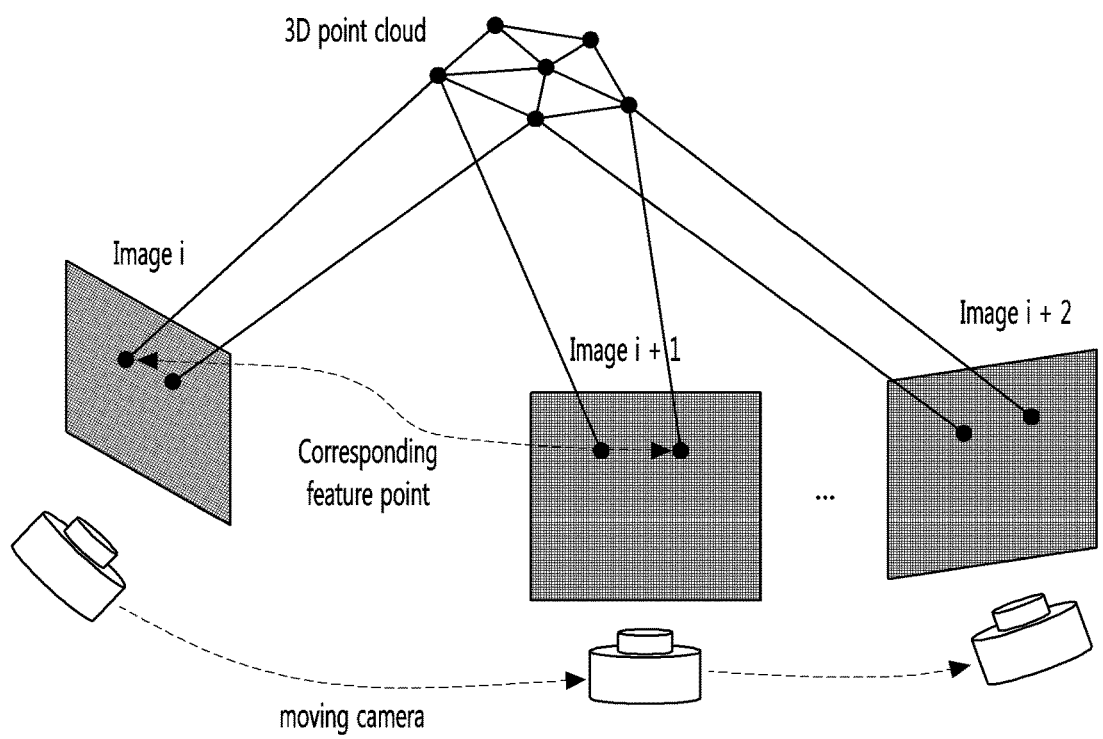
FIG. 6 is a diagram for describing a 3D geometry reconstruction method based on Structure from Motion (SfM).

FIG. 6 is a diagram for describing an SfM-based 3D geometry reconstruction method.

In one embodiment of the present disclosure, the SfM-based 3D geometry reconstruction method may perform a Scale Invariant Feature Transform (SIFT) process from a plurality of images as shown in FIGS. 5A, 5B and 6, extract feature points of each image, match the extracted feature points, and calculate a direction of each camera with respect to each image and a pose of each camera with respect to rotation. When the pose of each camera is calculated, 3D coordinates of the feature points in a virtual space may be known, and a 3D point cloud may be generated based on the 3D coordinates of the feature points.

Figure 7:
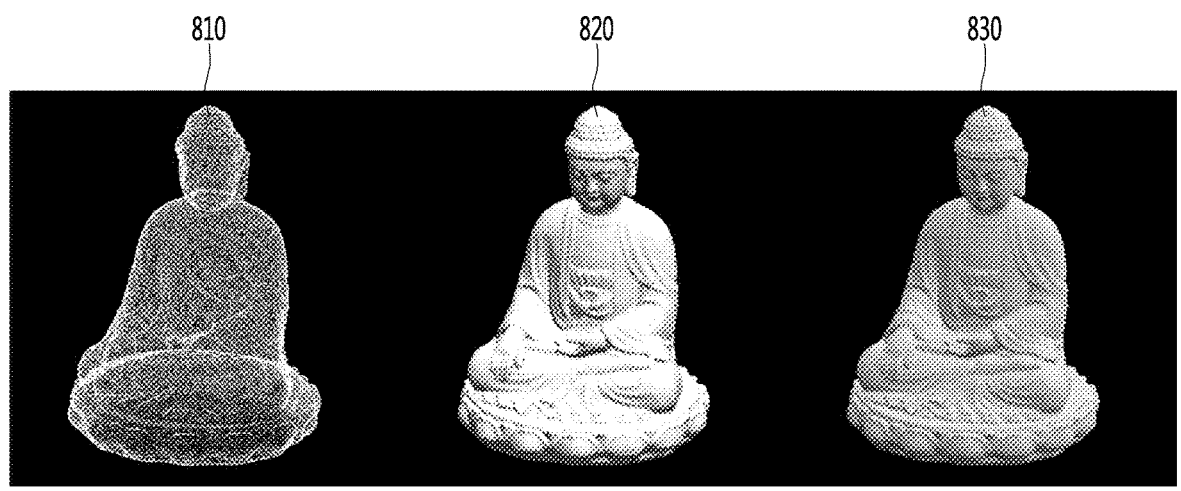
FIG. 7 is a diagram for describing a 3D reconstruction result according to an embodiment of the present disclosure.

FIG. 7 is a diagram for describing a 3D reconstruction result according to an embodiment of the present disclosure.

Referring to FIG. 7, in one embodiment of the present disclosure, the 3D reconstruction apparatus 200 including material appearance modeling may generate a 3D point cloud 810. Also, the 3D reconstruction apparatus 200 including material appearance modeling may generate a mesh-shaped 3D reconstruction result 820 by performing 3D Poisson surface reconstruction on the 3D point cloud. Also, the 3D reconstruction apparatus 200 including material appearance modeling may reconstruct 830 normal information of the 3D point cloud.

In one embodiment of the present disclosure, the 3D reconstruction apparatus 200 including material appearance modeling may perform measurement at a plurality of dense angles, as compared with 3D scanners. Thus, a 3D point cloud having high density may be generated, and 3D reconstruction having higher accuracy of millimeter unit may be possible.

Again, FIG. 3 is described.

In the estimating of the reflection model (S430), the 3D reconstruction apparatus 200 including material appearing modeling may automatically extract an image region necessary for 3D reconstruction and reflection characteristic estimation with respect to each image.

Figure 8:
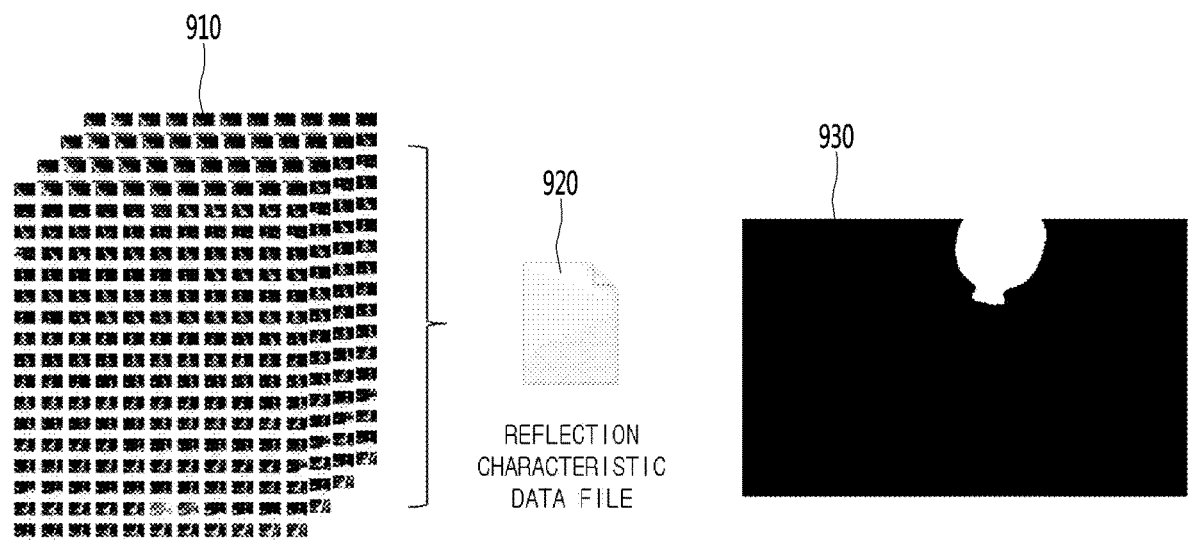
FIGS. 8 and 9 are diagrams for describing a reflection model estimation algorithm according to an embodiment of the present disclosure.
Figure 9:
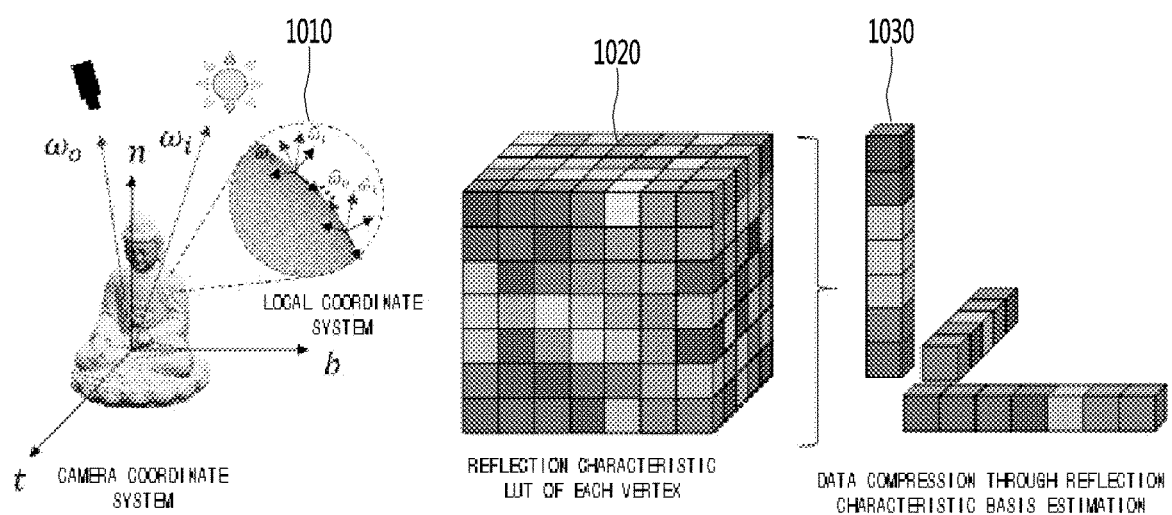

FIGS. 8 and 9 are diagrams for describing a reflection model estimation algorithm according to an embodiment of the present disclosure.

Referring to FIG. 8, tens of thousands of images of the measured reflection characteristic data may include not only unnecessary regions in each image region but also images unnecessary for reflection characteristic estimation and 3D reconstruction. Therefore, in one embodiment of the present disclosure, the 3D reconstruction apparatus 200 including material appearing modeling may automatically extract 930 an image region necessary for 3D reconstruction and reflection characteristic estimation with respect to each image.

In the compressing of the data (S440), the 3D reconstruction apparatus 200 including material appearance modeling may compress data based on the extracted region.

In one embodiment of the present disclosure, the 3D reconstruction apparatus 200 including material appearance modeling may compress data based on the extracted region. Specifically, the 3D reconstruction apparatus 200 including material appearance modeling may automatically store tens of thousands of images, which requires a storage space of tens of GBs, into a single file having a size of several GBs.

According to one embodiment of the present disclosure, the 3D reconstruction apparatus 200 including material appearance modeling has an advantage that can load data necessary for sequential reflection characteristic estimation of each point cloud by using compressed data containing entire information necessary for reflection characteristics and 3D reconstruction, thereby facilitating memory loading.

In one embodiment of the present disclosure, the 3D reconstruction apparatus 200 including material appearance modeling performs material appearance modeling through a spatially varying BRDF (SVBRDF) method or a Bidirectional Texture Function (BTF) method, thereby improving cost reduction and efficiency.

Specifically, the 3D reconstruction apparatus 200 including material appearance modeling may automatically estimate lookup table (LUT) based on data interpolation through reflection characteristic data of each point stored in a reflection characteristic data file as shown in FIG. 9. Such an algorithm may include a correction algorithm that automatically corrects an error occurring in measurement of shadows or the like caused by camera occlusion or object shape.

Since the reflection characteristic LUT of the entire vertices is stored in several GBs, there is a need for high-efficiency data compression technology that compresses the LUT in units of several tens of MBs.

In one embodiment of the present disclosure, the 3D reconstruction apparatus 200 including material appearance modeling may compress the reflection characteristic LUT of the entire vertices at a ratio of several tens to one through a basis estimation technique of 3D data.

In the performing of the rendering (S450), the 3D reconstruction apparatus 200 including material appearance modeling may generate a rendered image by arranging a 3D virtual object in a virtual space, reflecting a virtual light source environment condition, and calculating a surface reflection function at each pixel or vertex.

In one embodiment of the present disclosure, the 3D reconstruction apparatus 200 including material appearing modeling may express the rendered image with a color and reflection degree of the virtual object according to a color and a direction of a light source and a view desired by a user.

Unlike the conventional 3D scanner, since the 3D geometry and the material appearance modeling are included, the 3D reconstruction apparatus 200 including the material appearance modeling may reconstruct an object more realistically.

That is, according to one embodiment of the present disclosure, the 3D reconstruction apparatus 200 including material appearance modeling may measure data densely at a plurality of hemi-spherical angles in such a manner that each arc frame having a camera and a light source attached thereto is rotated. Thus, as compared with an existing 3D scanner, more precise 3D reconstruction may be possible, and data for reflection model estimation may be acquired as well.

Also, the 3D reconstruction apparatus 200 including material appearance modeling compresses data necessary for reflection model estimation in several tens of MB through reflection model estimation and data compression process, thereby enabling real-time rendering.

Also, the 3D reconstruction apparatus 200 including material appearance modeling may easily generate realistic 3D virtual content considering reflection characteristics in a one-button form, without user's manual intervention.

Specifically, since the realistic 3D virtual content generated by one embodiment of the present disclosure is not greatly different from the original, it can be directly used for movie, advertisement, display, and the like. Also, since it is not a conventional scanner method directly projecting patterns or light sources on an object but a non-contact reconstruction method, digital archiving and reconstruction of an object required to be stored may be possible. These characteristics may be used to reconstruct cultural properties.

According to the 3D reconstruction apparatus and method including material appearance modeling, 3D modeling information including information about geometry and texture can be provided.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A 3D reconstruction apparatus including material appearance modeling, comprising:
   a light source arc including a plurality of light sources configured to irradiate an object located at a photographing stage;
   a camera arc including a plurality of cameras configured to photograph the object located at the photographing stage;
   a driving operation unit configured to rotate the light source arc and the camera arc;
   the photographing stage on which the object is disposed; and
   a control unit configured to control the operations of the plurality of light sources included in the light source arc, the operations of the plurality of cameras included in the camera arc, and the driving operation unit,
   wherein the control unit is further configured to:
      rotate the light source arc and the camera arc at a constant interval based on an operation axis through the driving operation unit in order to acquire a plurality of image samples of the object,
      extract an image region from each of the image samples which is necessary for 3D reconstruction and reflection characteristic estimation of the object,
      compress the plurality of image samples based on the extracted image region by merging the extracted image region in one file,
      estimate a lookup table for entire vertices based on data interpolation through reflection characteristic data of each point stored in the merged file,
      estimate basis of the lookup table for entire vertices to compress the lookup table for entire vertices, and
      reconstruct a 3D model corresponding to the object with 3D shape and surface textures using the estimated basis,
   wherein the surface textures include color and reflection corresponding to the object,
   wherein the plurality of image samples are acquired by operating the light source and the camera at a predefined location in a hemi-sphere direction with respect to the object.

2. The 3D reconstruction apparatus according to claim 1, wherein the control unit is configured to:
   extract feature points of each of the image samples by using the plurality of image samples,
   match the feature points to calculate poses of the cameras with respect to directions and rotations of the cameras with respect to each of the image samples,
   generate 3D coordinates in a virtual space of the feature points when the poses of the cameras are calculated, and
   generate a 3D point cloud.

3. The 3D reconstruction apparatus according to claim 2, wherein the control unit is configured to generate a 3D reconstruction result in a mesh shape by using a Poisson surface reconstruction method.

4. The 3D reconstruction apparatus according to claim 1, wherein an angle between the light sources disposed in the light source arc is constant.

5. The 3D reconstruction apparatus according to claim 1, wherein an angle between the cameras disposed in the camera arc is constant.

6. A method for controlling a 3D reconstruction apparatus including material appearance modeling, the method comprising:
   controlling, via a control unit of the 3D reconstruction apparatus, a light source arc and a plurality of light sources included in the light source to irradiate light on an object disposed on a photographing stage; and controlling, via the control unit, a camera arc and a plurality of cameras included in the camera arc to photograph the object disposed on the photographing stage, wherein controlling the light source arc and controlling the camera arc comprises rotating the light source arc and the camera arc at a constant interval based on an operation axis in order to acquire a plurality of image samples of the object, the method further comprises:

extracting, via the control unit, an image region from each of the image samples which is necessary for 3D reconstruction and reflection characteristic estimation of the object, compressing, via the control unit, the plurality of image samples based on the extracted image region by merging the extracted image region in one file, estimating, via the control unit, a lookup table for entire vertices based on data interpolation through reflection characteristic data of each point stored in the merged file, estimating, via the control unit, basis of the lookup table for entire vertices to compress the lookup table for entire vertices, and reconstructing, via the control unit, a 3D model corresponding to the object with 3D shape and surface textures using the estimated basis, wherein the surface textures include color and reflection corresponding to the object, wherein the plurality of image samples are acquired by operating the light source and the camera at a predefined location in a hemi-sphere direction with respect to the object.

7. The method according to claim 6, further comprising:

extracting, via the control unit, feature points of each of the image samples by using the plurality of image samples;

matching, via the control unit, the feature points to calculate poses of the cameras with respect to directions and rotations of the cameras with respect to each of the image samples;

generating, via the control unit, 3D coordinates in a virtual space of the feature points when the poses of the cameras are calculated; and generating, via the control unit, a 3D point cloud.

8. The method according to claim 7, further comprising generating, via the control unit, a 3D reconstruction result in a mesh shape by using a Poisson surface reconstruction method.

* * * * *